(12) United States Patent
Van Dijk et al.

(10) Patent No.: US 7,877,604 B2
(45) Date of Patent: Jan. 25, 2011

(54) PROOF OF EXECUTION USING RANDOM FUNCTION

(75) Inventors: Marten Erik Van Dijk, Cambridge, MA (US); Pim Theo Tuyls, Eindhoven (NL)

(73) Assignee: Intrinsic ID B.V., Eindhoven (NL)

( * ) Notice: Subject to any disclaimer, the term of this patent is extended or adjusted under 35 U.S.C. 154(b) by 1170 days.

(21) Appl. No.: 10/556,520

(22) PCT Filed: May 6, 2004

(86) PCT No.: PCT/IB2004/002342

§ 371 (c)(1),
(2), (4) Date: Aug. 14, 2006

(87) PCT Pub. No.: WO2004/102302

PCT Pub. Date: Nov. 25, 2004

(65) Prior Publication Data

US 2007/0039046 A1 Feb. 15, 2007

Related U.S. Application Data

(60) Provisional application No. 60/471,452, filed on May 16, 2003.

(51) Int. Cl.
*H04L 9/32* (2006.01)
(52) U.S. Cl. ............... 713/168; 713/180; 713/187; 726/9; 726/22; 726/26
(58) Field of Classification Search ............... 713/168
See application file for complete search history.

(56) References Cited

U.S. PATENT DOCUMENTS

2003/0041250 A1* 2/2003 Proudler ............... 713/182
2003/0204743 A1* 10/2003 Devadas et al. ............... 713/200

* cited by examiner

*Primary Examiner*—Emmanuel L Moise
*Assistant Examiner*—Shewaye Gelagay
(74) *Attorney, Agent, or Firm*—Nixon & Vanderhye P.C.

(57) ABSTRACT

A physical random function (PUF) is a function that is easy to evaluate but hard to characterize. Controlled physical random functions (CPUFs) are PUFs that can only be accessed via a security program controlled by a security algorithm that is physically bound to the PUF in an inseparable way. CPUFs enable certified execution, where a certificate is produced that proves that a specific computation was carried out on a specific processor. The invention provides an additional layer for generating a proof of execution which any third party can verify. This proof of execution is also useful to provide secure memory and secure interruptible program execution.

14 Claims, 4 Drawing Sheets

PROOF OF EXECUTION USING RANDOM FUNCTION

CROSS-REFERENCE TO RELATED APPLICATIONS

This application is a 371 of PCT/IB04/02342 filed May 6, 2004 which claims benefit of U.S. Provisional Application Ser. No. 60/471,452 filed May 16, 2003.

FIELD

The invention relates to a method to prove authenticity of program execution, to a system arranged to implement such a method, to a computer program product for implementing such a method, to computer executable instructions for implementing such a method, and to a signal carrying proof results generated by such a method.

BACKGROUND

In applications such as electronic transactions it may be required to verify that a computation (or program) has actually been executed on a specific processor, either by a user or by a third party. In "Controlled Physical Random Functions", by Blaise Gassend and Dwaine Clarke and Marten van Dijk and Srinivas Devadas, Proceedings of the 18th Annual Computer Security Applications Conference, December, 2002 (further referred to as "prior art document"), certified execution is defined as a process that produces, together with the computation output, a certificate (called e-certificate) which proves to the user of a specific processor chip that a specific computation was carried out on that specific processor chip, and that the computation was executed and did produce the given computation output.

SUMMARY

The framework used in the prior art document for generation and verification of an e-certificate is built on the concept of a Physical Random Function. A Physical Random Function (PUF) is a random function that is evaluated with the help of a complex physical system. The use of the abbreviation PUF (instead of PRF) has the advantage of being easier to pronounce, and it avoids confusion with Pseudo-Random Functions. PUFs can be implemented in different ways. Some of the implementations of PUFs are easy to produce in such a way that each production sample (for example each individual semiconductor chip) implements a different function. This enables a PUF to be used in authenticated identification applications.

A PUF is a function that maps challenges to responses, that is embodied by a physical device, and that has the following two properties: (1) the PUP is easy to evaluate: the physical device is easily capable of evaluating the function in a short amount of time, and (2) the PUF is hard to characterize: from a polynomial number of plausible physical measurements (in particular, determination of chosen challenge-response pairs), an attacker who no longer has (access to) the security device, and who can only use a polynomial amount of resources (time, matter, etc. . . . ) can only extract a negligible amount of information about the response to a randomly chosen challenge. In the above definition, the terms short and polynomial are relative to the size of the device, which is the security parameter. In particular, short means linear or low degree polynomial. The term plausible is relative to the current state of the art in measurement techniques and is likely to change as improved methods are devised.

Examples of PUFs are Silicon PUFs (Blaise Gassend and Dwaine Clarke and Marten van Dijk and Srinivas Devadas, Silicon Physical Random Functions, Proceedings of the 9th ACM Conference on Computer and Communications Security, November, 2002), Optical PUFs (P. S. Ravikanth, Massachusetts Institute of Technology, Physical One-Way Functions, 2001), and Digital PUFs. Silicon PUFs use inter-chip variations that are due to the manufacturing process. Optical PUFs employ the unpredictability of the speckle pattern generated by optical structures that are irradiated with a coherent light (laser) beam. Digital PUFs refer to the classical scenario where a tamper resistant environment protects a secret key, which is used for encryption and authentication purposes.

A PUF is defined to be Controlled (a controlled PUF or CPUF) if it can only be accessed via a security algorithm that is physically linked to the PUF in an inseparable way within a security device (i.e., any attempt to circumvent the algorithm will lead to the destruction of the PUF). In particular this security algorithm can restrict the challenges that are presented to the PUF and can limit the information about responses that is given to the outside world. Control is the fundamental idea that allows PUFs to go beyond simple authenticated identification applications.

An example of a CPUF is described in the prior art document. A security program is used under control of the security algorithm, linked to the PUF, such that the PUF can only be accessed via two primitive functions GetSecret(.) and GetResponse(.) from the security program. GetSecret(.) ensures that the input to the PUF depends on a representation of the security program from which the primitive functions are executed. GetResponse(.) ensures that the output of the PUF depends on a representation of the security program from which the primitive functions are executed. Because of this dependence, the input to the PUF and output of the PUF will be different if these primitive functions are executed from within a different security program. Furthermore, these primitive functions ensure that the generation of new challenge-response pairs can be regulated and secure, as is also described in the prior art document.

Certified execution (as described in the prior art document) uses the GetSecret(.) primitive on a challenge for which the user can compute the output based on a secret PUP challenge-response pair that is known only to the user. This way the output can be used towards the user to prove that he executed an algorithm on the specific processor chip with the PUF algorithm.

However, the user can not use the output to prove to a third party that the program was actively executed on a specific processor, because the user could have produced the result himself using his challenge-response pair. However, in for example electronic transaction systems, it is often desirable to be able to actually prove to a third party that a program (such as a program to pay a fee for viewing a program) has been executed on a specific processor.

It is therefore an object of the invention to provide a method that enables the generation of proof results, that can be used as a proof of execution for a specific computation on a specific processor, called e-proof, as a certificate that is verifiable by any third party.

This object is realized by a method to prove authenticity of execution of program instructions, comprising—a step of executing program instructions under control of a security program on a security device comprising a random function, the random function being accessible only from the security program through a controlled interface, the controlled interface comprising at least one primitive function accessing the random function that returns output that depends on at least part of a representation of at least those parts of the security program that call the primitive function,—a step of, using the random function, computing proof results during execution of the security program operating in a first mode by accessing the random function through the controlled interface, and—a step of, using the random function, verifying the proof results during execution of the same security program operating in a second mode by accessing the random function through the controlled interface.

The security program can be run in different operation modes, either in the same or different execution runs. By having at least two operation modes in the same program, the security program can advantageously use the random function in different program executions. Because the primitive function accessing the random function depends also on the representation of at least part of the security program, which is the same security program operating in different modes, access to the random function is guaranteed for the security program in these different modes, and any other security program can not access the random function in a way that compromises the security offered by the random function. The "multi-mode" program is therefore an advantageous concept as the functionality in the other modes is already clearly defined and limited during the first time the security program is executed.

By making the output depend on a representation of the security program, it is (almost) guaranteed that any other security program that is run on the security device, obtains different results for the same input through the controlled interface. Any other security program, for example designed by a hacker to obtain information to generate illicit proof results, obtains (with a high probability depending on the representation method) only useless results through the controlled interface because the results depend on the security program representation, which is different for the original security program and the security program used by the hacker.

The representation of the security program could be a hash or other signature, or a part thereof. Normally, the representation of the security program covers the complete security program, but in special cases (for example where the security program contains large parts that don't concern the random function) it might be advantageous to limit the representation to those parts of the security program that handle the calling and handling of the input and output of the primitive functions.

During execution of the security program, a key can be derived using a primitive function of which the output depends also on a representation of the security program. This key can be used to encrypt (part of) the proof results. Any result that is encrypted by this key is useless except in subsequent executions of the same security program, either in the same or in a different mode.

The security program is typically provided by the user of the security device. This could also be a different subsystem or another system.

To allow quick retrieval of a specific security program for later use, the program code could therefore be stored, or a hash code thereof, for subsequent execution of the security program in the same or in a different mode, optionally together with information about permission who is allowed subsequent execution.

Using this method CPUFs can be used to produce as proof results a proof of execution, called e-proof, which is a certificate verifiable by any third party. For example, in a STB application a broadcaster communicates to the STB to sell content to its owner (or the one who rents it). The broadcaster uses the STB of the owner and wants to perform certified execution of the program which includes the transaction between the owner and the broadcaster. The broadcaster wants to enable any arbiter to verify that the owner bought content. This requires a proof of execution. Other applications are electronic transactions in e-commerce, e-banking, and e-business.

A first embodiment of the invention is described in claim 2. The proof results can be used as a proof of execution, called e-proof, as a certificate for (possibly later) verification by the security device towards any third party, without intervention being required from the original user of the security device. Any third party with access to the e-proof is able to verify, using the proof results and the security device, whether the security device has actually produced the e-proof.

An advantageous implementation of the first embodiment of the invention is described in claim 3. In this variation, the security program that produces the proof results in the first mode (in this embodiment further referred to as: execution mode) also runs the actual application program in the execution mode. In the second mode (to be referred to as: verification mode) the security program verifies and optionally decrypts the proof results. As the security program executes as part of the execution mode an application program, the proof results extend to the authentic execution of the application program. The proof results may contain (parts of) the application program, (parts of) the application program input, and (parts of) the application program output, to ensure that the verification may cover verification which application program has been executed, and/or which input and output was used respectively was generated. In addition, this may allow the (partial) recovery of this information in arbitration mode. Depending on the application, its purpose, and the security policy, it is up to the security program whether to output these decrypted parts.

A further implementation of the first embodiment of the invention is described in claim 4. In this variation, a third party, in possession of proof results generated by a specific security program which operated in the first mode, sends the proof results to the security device as input for running the same security program, which is subsequently run in a second mode to verify (and optionally retrieve by decrypting) the proof results and subsequently send convincing evidence (and optionally the decrypted results) back to the third party. This information is conceived to convince the third party that the proof results were computed in a first mode by the same security device and by the same security program.

A second embodiment of the invention is described in claim 5. In this second embodiment, the proof results comprise (possibly encrypted) storage data to be used for secure data storage. By associating the first mode with a memory store, and the second mode with a memory load operation, proof results comprising (encrypted) data can be stored in a memory location. This way an insecure physical memory can be made secure by verifying/authenticating the memory contents upon memory access. Both the first and second mode can be used multiple times in the same or in different execution runs of the security program.

A possible implementation of the second embodiment of the invention is described in claim 6. By encrypting the stored data in the proof results the stored data can not be retrieved from the proof results except by the security program itself. It is up to the security program whether (parts of) these data are output to the outside world.

A third embodiment of the invention is described in claim 7. This embodiment is advantageous as it enables to store status information about program execution. This allows a program to reliably continue substantially in the same state after an interrupt, after a standby or power-down (either intended or unintended), etcetera. Upon continuation, the status information is verified in the second mode before it is relied upon to have been originated from the same program operating in the first mode.

A further implementation of the third embodiment of the invention is described in claim 8. By encrypting the status information in the proof results the status information can not be retrieved from the proof results except by the security program itself.

An implementation of the invention is described in claim 9. As the operation mode to be selected can not be hard-coded in the security program itself, a different method of selecting the operation mode is required. A very elegant and useful method to select the operation mode is to have the user of the security device supply the mode as input to the security program.

An advantageous implementation of the invention is described in claim 10. In order to prove to a user of a security device who is either asking the security device to generate proof results or to verify the proof results, that the generation or verification is actually performed on the same security device, the security program is preferably executed as part of a second security program, the second security program implementing certified execution as described in the prior art document.

A more specific implementation of the invention is described in claim 11. In this implementation a PUF is used for implementing the random function that is used in the primitive functions.

A more specific implementation of the invention is described in claim 12. When a random hash function h(.) is used, which is preferably (almost) collision-free, these primitive functions can be used to advantage to reliably generate a key which is used both in the first mode to generate proof results and in the second mode to verify the proof results or obtain information from the proof results. It should be understood that, as described in claim 1, Program represents only the relevant parts (from a security point of view) of the security program.

A more specific implementation of the invention is described in claim 13. The generated key for computing the proof results in this implementation also depends on at least part of the input variables. This had the advantage that (application) program inputs do not have to be hard-coded in the security program in order to be protected by the proof results. Not all inputs need to be considered, as some inputs may not be of interest, should remain confidential between security device and user of the security device (and thus not be communicated to a third party), or should be allowed to be different between different program executions (the input which determines the operation mode should of course not be used).

The system according to the invention is characterized as described in claim 14.

The computer program product, such as a computer readable medium, according to the invention is characterized as described in claim 15.

Computer executable instructions according to the invention are characterized as described in claim 16.

The signal according to the invention is characterized as described in claim 17.

BRIEF DESCRIPTION OF THE DRAWINGS

These and other aspects of the invention will be further described by way of example and with reference to the schematic drawings, in which.

Throughout the figures, same reference numerals indicate similar or corresponding features. Some of the features indicated in the drawings are typically implemented in software, and as such represent software entities, such as software modules or objects.

DETAILED DESCRIPTION

Figure 1:
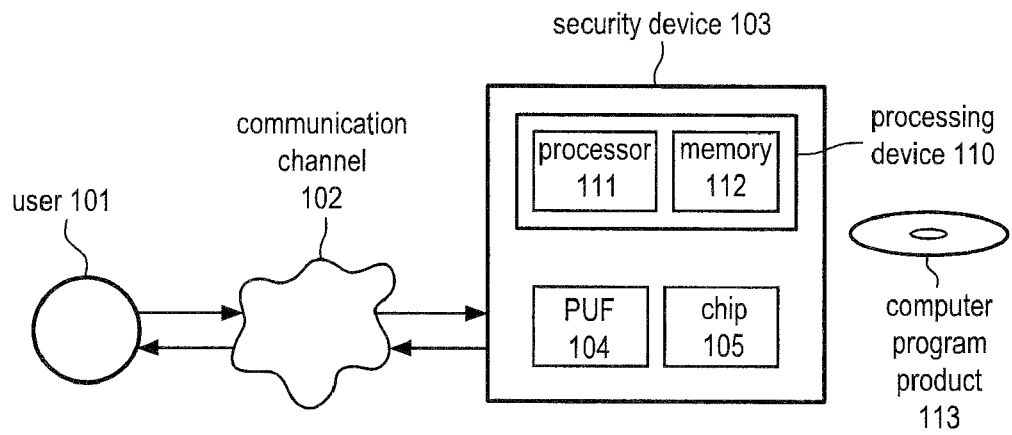
FIG. 1 illustrates the basic model for applications using the PUF.

FIG. 1 illustrates the basic model for applications using security device 103 comprising a PUF 104. The model, implemented by the system 100, comprises:

A user 101 who wants to make use of the computing capabilities of a chip 105 in or under control of a security device 103.

The user and the chip are connected to one another by a possibly untrusted public communication channel 102. The user can not only be a person, but also a different piece of software, hardware, or other device.

Security device 103 could be implemented by a processing device 110 comprising a processor 111 and memory 112, the processing device arranged for executing computer executable instructions from a computer program product 113.

The prior art document describes the handling of Challenges and Responses which are unique for each specific PUF. Given a challenge, a PUF can compute a corresponding response. A user is in possession of her own private (certified) list of CRPs (challenge-response pairs) originally generated by the PUF. The list is private because (besides the PUF perhaps) only the user knows the responses to each of the challenges in the list, The user's challenges can be public. It is assumed that the user has established several CRPs with the security device.

The responses to (a limited number of) the challenges are only known to the user. Additionally, the security device may (re)compute the response for a specific challenge. To prevent other persons to recover the response for a specific challenge, a secure way of managing the CRPs is needed. The prior art document proposes the concept of a Controlled PUF to achieve this. A PUF is defined to be Controlled (a controlled PUF or CPUF) if it can only be accessed via a security algorithm that is physically linked to the PUF in an inseparable way (i.e., any attempt to circumvent the algorithm will lead to the destruction of the PUF). In particular this security algorithm can restrict the challenges that are presented to the PUF and can limit the information about responses that is given to the outside world. Control is the fundamental idea that allows PUFs to go beyond simple authenticated identification applications. PUFs and controlled PUFs are described and known to implement smartcard identification, certified execution and software licensing.

To prevent man-in-the-middle attacks, a user is prevented from asking for the response to a specific challenge, during the CRP management protocols. This is a concern in the CRP management protocols, as, in these protocols, the security device sends responses to the user. This is guaranteed by limiting the access to the PUF, such that the security device never gives the response to a challenge directly. CRP management occurs as described in the prior art document. In the application protocols, the responses are only used internally for further processing such as to generate Message Authentication Codes (MACs), and are never sent to the user. The CPUF is able to execute some form of program, (further: a security program), in a private way (nobody can see what the program is doing, or at least the key material that is being manipulated remains hidden) and authentic way (nobody can modify without being detected what the program is doing).

The CPUF's control is designed such that the PUF can only be accessed via a security program, and more specifically by using two primitive functions GetResponse(.) and GetSecret (.). A set of primitive functions which can be used to implement the invention is defined as:

GetResponse(PC)=f(h(h(SProgram),PC))

GetSecret(Challenge)=h(h(SProgram),f(Challenge))

where f is the PUF and h is a publicly available random hash function (or in practice some pseudo-random function). In these primitive functions, SProgram is the code of the program that is being run in an authentic way. The user of the device may deliver such a security program. Note that h(Sprogram) includes everything that is contained in the program, including hard-coded values (such as, in some cases, Challenge). The security device calculates h(SProgram), and later uses this value when GetResponse(.) and GetSecret(.) are invoked. The computation of h(SProgram) can be done Oust) before starting the security program, or before the first instantiations of a primitive function. As shown in the prior art document, these two primitive functions are sufficient to implement secure CRP management where GetResponse(.) is essentially used for CRP generation while GetSecret(.) is used by applications that want to produce a shared secret from a CRP.

In the sequel, the following notations are used:

E(m,k) is the encryption of message m with the key k.

D(m,k) is the decryption of message m with the key k.

M(m,k) MACs message m with key k.

E&M(m,k) encrypts and MACs message m with the key k.

D&M(m,k) decrypts message m with the key k if the MAC matches. If the MAC does not match, it outputs the message that the MAC does not match and it does not perform any decryption.

The concept of certified execution is described in the prior art document. This technology will be illustrated by a number of specific implementations. Certified execution is provided using a so-called e-certificate. An e-certificate for a program XProgram with input Input on a security device is defined as a string efficiently generated by XProgram(Input) on the security device such that the user of the security device can efficiently check with overwhelming probability whether the outputted results of XProgram were generated by XProgram (Input) on the security device. The user who requests execution of XProgram on the security device can rely on the trustworthiness of the security device manufacturer who can vouch that he produced the security device, instead of relying on the owner of the security device.

Figure 2:
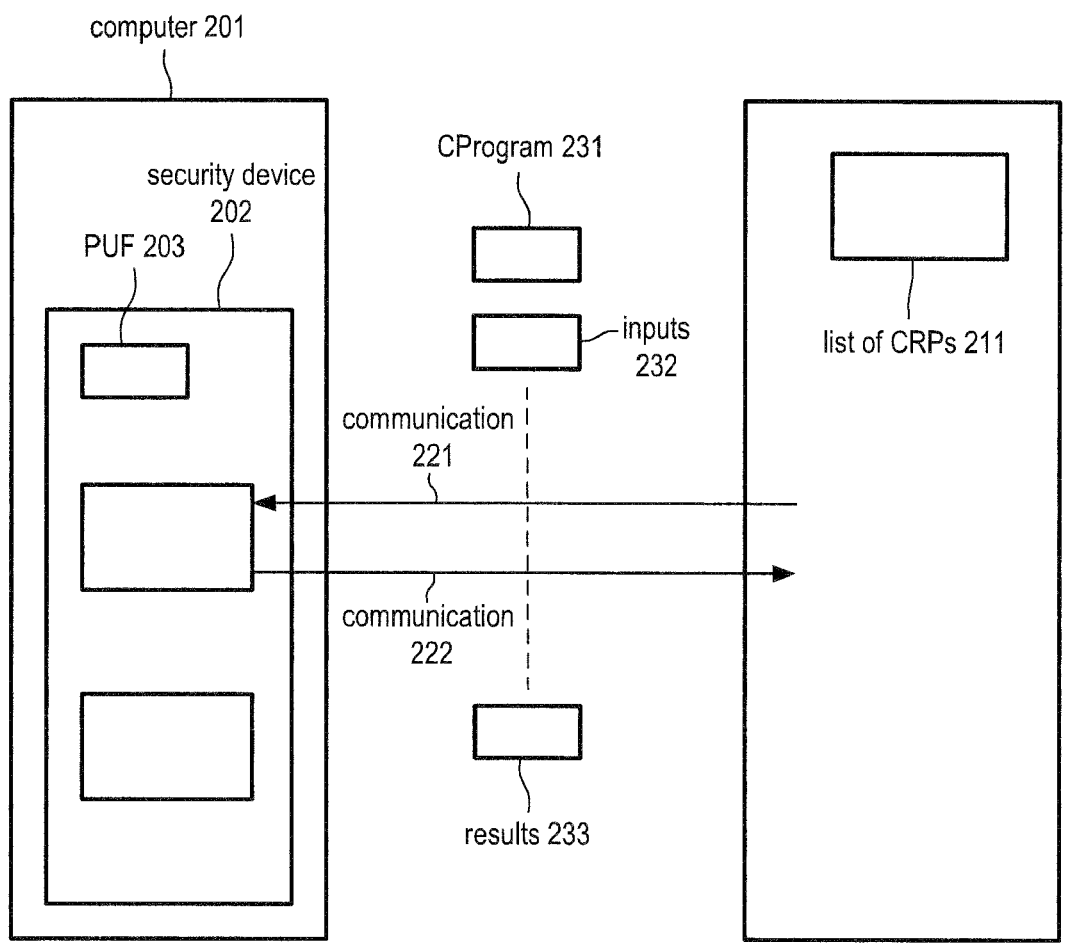
FIG. 2 illustrates an example use of certified execution.

FIG. 2 illustrates a simple example of certified execution, in which the computation is done directly on the security device. A user, Alice, wants to run a computationally expensive program Program(Input) on Bob's computer 201. Bob's computer has a security device 202, which has a PUF 203. It is assumed that Alice has already established a list of CRPs 211 with the security device. Let (Challenge,Response) be one of Alice's CRPs for Bob's PUF. In a first implementation variation, Alice sends (in communication 221) the following program CProgram1 231, with input Inputs 232 equal to (Challenge,E&M((XProgram,Input),h(h(Cprogram),Response))), to the security device 202.

```
CProgram1(Inputs):
begin program
    var Challenge,EM,XProgram,Input,Result,Certificate;
        (Challenge,EM)=Inputs;
        Secret=GetSecret(Challenge);
        (XProgram,Input)=D&M(EM,Secret);
        Abort if the MAC does not match;
        Result=XProgram(Input);
        Certificate=M(Result,Secret);
        Output(Result,Certificate);
end program
```

In a second implementation variation, Alice sends the following program CProgram2 with input Inputs equal to (E&M ((XProgram,Input),h(h(Cprogram),Response))) to the security device. This variation is more robust as it hard-codes the value of Challenge in CProgram2. Hence, the value of Challenge is used in the primitive functions.

```
CProgram2(Inputs):
begin program
    const Challenge=...;
    var EM,XProgram,Input,Result,Certificate;
        (EM)=Inputs;
        Secret=GetSecret(Challenge);
        (XProgram,Input)=D&M(EM,Secret);
        Abort if the MAC does not match;
        Result=XProgram(Input);
        Certificate=M(Result,Secret);
        Output(Result,Certificate);
end program
```

By Result=XProgram(Input) it is understood that Result is part of the output of XProgram(Input). There may be more output for which no e-proof is needed. Output( . . . ) is used to send results 233 out of the CPUF as shown in communication 222. Anything that is sent out of the security device is potentially visible to the whole world (except during bootstrapping, where the manufacturer is in physical possession of the security device). A secure design of the program generates a result which is placed in encrypted form in Result. The encryption can be done by means of classical cryptography or by using Secret. In the latter case, Secret is contained in Input.

Because Alice's CRP is private, no other person can generate Secret and, hence, a MAC with Secret. A MAC is used at two spots in the program. The first MAC is checked by the program and guarantees the authenticity of Inputs. The second MAC is checked by Alice and guarantees the authenticity of the message that it gets back from the security device. Apart from Alice only the security device can generate Secret given Challenge by executing the program CProgram. This means that Result and Certificate were generated by CProgram on the security device. In other words CProgram performed the certified execution with Inputs as input. This proves that Certificate is an e-certificate.

It follows that e-certificates can be used for secure remote computation. If Certificate matches, then this proves to Alice that XProgram(Input) was executed (by CProgram(Inputs)) on the security device.

Certified execution as described in the prior art document can not be used by Alice towards a third party to prove execution of XProgram as proof of execution. Using her CRP, Alice can fake an e-certificate Certificate for any result Result. This follows from the fact that Alice can compute Secret by using the response related to Challenge. Due to the fact that Alice needs her CRP (to check the MAC), it follows that Alice can not use the e-certificate Certificate as a proof of execution to prove to third parties that she executed XProgram(Input) (in CProgram(Inputs)) on Bob's security device.

In a first embodiment of the current invention, proof results are used that can be used as a proof of execution towards any third party. An e-proof EProof for a program XProgram with input Input producing results Results on a security device is defined as a string generated by XProgram(Input) on the security device such that there exists a protocol A1 between the security device and any arbiter with inputs EProof and XProgram and maybe some auxiliary information, which can efficiently decide correctly with overwhelming probability whether EProof was generated by XProgram(Input) on the security device or not, and if correctly generated, recover with overwhelming probability (part of) the results Result which were previously generated together with EProof by XProgram(Input) on the security device. Protocol A1 is called an arbiter protocol. The following example shows that an e-proof can be used by both the owner and the user of the security device.

In order to support proof of execution, it is required to extend the solution of certified execution with an additional program layer for generating a proof of execution. A user, Alice, wants to run an application program AProgram on Bob's computer having a single security device with PUF. Alice has already established CRPs with Bob's security device.

Figure 3:
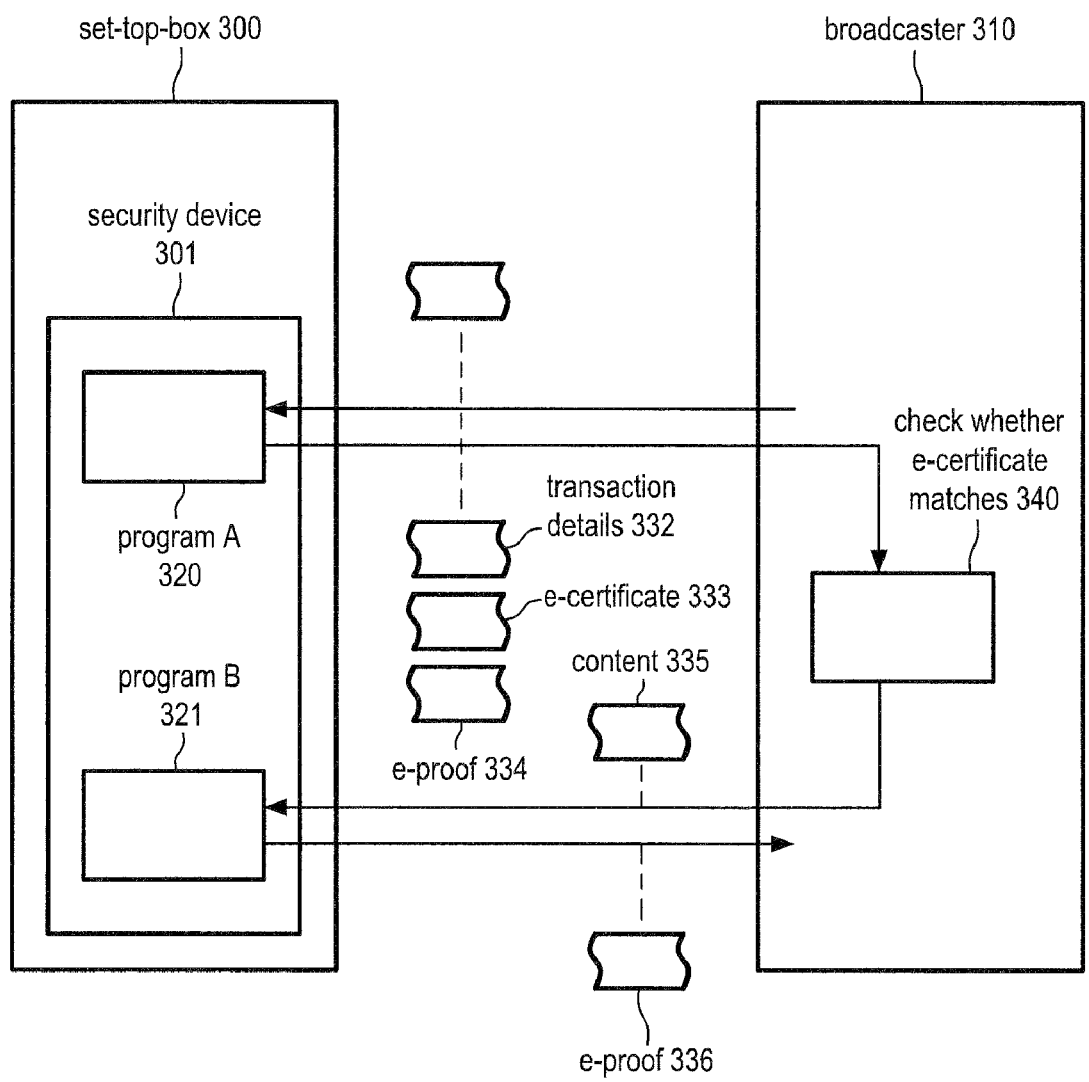
FIG. 3 illustrates an example use of proof of execution.

As a first example where this embodiment can be used, consider a STB (set-top-box) application where Alice is the broadcaster 310 and Bob is the owner of the STB 300 with a security device 301, see FIG. 3. In program A 320 Bob buys a service. Alice receives the transaction details 332, an e-certificate 333 (the e-certificate verifies the authenticity of both the transaction details and e-proof), and an e-proof 334. Alice checks in step 340 whether the e-certificate matches. If so, she knows that e-proof was generated by Bob's STB and she continues the transaction in program B. The e-proof can be used as a confirmation that Bob has bought the service because an arbiter can recover the transaction details. In program B 321, Bob receives the content 335 belonging to the service he requested. The content may be encrypted by using a CRP. Alice receives a second e-proof 336 of Bob's actions in program B. In first instance, it seems as if Bob does not receive a proof of Alice's promise to send him the content in program B. However, not only Alice but also Bob can use the first e-proof. Any third party will be able to check that Bob's STB successfully performed the protocol encoded in program A, which is in itself Alice's promise to transmit the content to Bob in program B. For example, Bob can use the e-proof to convince third parties (and in particular Alice) that he bought a certain service, which may make him eligible for discounts and upgrades.

As a second example, suppose Alice wants to execute a program on Bob's security device with a time stamp as part of its input. The results of the execution may contain a copy of this time stamp with Bob's agreement that the time stamp represents the correct time of execution. For example, the program is designed such that it asks Bob if he agrees and aborts if Bob does not agree. Given a correct e-proof, an arbiter retrieves the results. Hence, he can check the time stamp and verify whether Bob and/or Alice's claims are still valid.

As a third example, assume a program Program' with different modes. Depending on its mode, Program' computes either (Result,EProof)=Program(Input) on processor P, where EProof is an e-proof for program Program with input Input on P, or Program' plays the role of arbiter checking whether EProof is a valid e-proof and, if so, it reconstructs Result. In the role of arbiter, EProof may be used as a ticket to the next mode in Program'. This technique implements conditional access.

Figure 4:
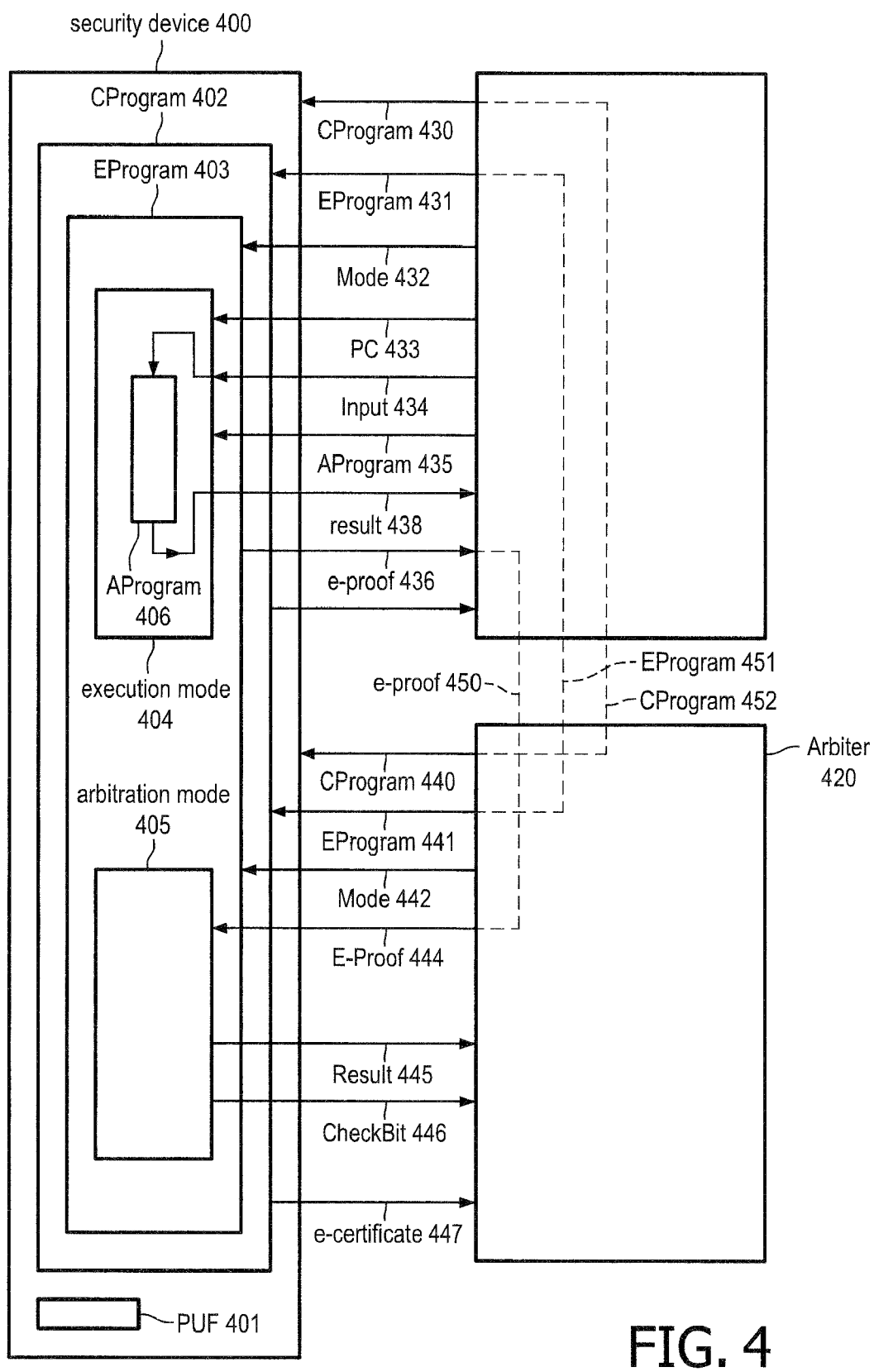
FIG. 4 illustrates an overview of the different program layers for generating an e-proof under certified execution.

FIG. 4 illustrates the different program layers. The program according to the invention that generates or verifies the proof of execution, called EProgram 403, is executed as the XProgram part of the certified execution program CProgram1 402 (or CProgram2 402) in a security device 400 with a PUF 401, in order that both the user and the third party are convinced that the execution took place on the security device. EProgram has both an execution mode 404 and an arbitration mode 405.

In execution mode the EProgram computes not only (in AProgram 406) the results in which Alice is interested but also an e-proof. Alice uses certified execution (by running EProgram as the XProgram part of CProgram) to be sure that the program was executed correctly on Bob's security device. An arbiter can check the e-proof by running the EProgram in arbitration mode, also using certified execution. The key idea is that the GetResponse(.) primitive depends on the hash of the complete program EProgram which contains both modes. Consequently, the e-proof which was generated by the program EProgram in the execution mode (with a key obtained through the GetResponse(.) primitive) can be decrypted by the program EProgram in the arbitration mode.

Security is determined by, firstly, the difficulty of breaking the GetResponse(.) primitive, that is breaking the hash and breaking the PUF with which GetResponse(.) is defined, and, secondly, the difficulty to break the encryption and MAC E&M(.) primitive.

Some variations of the EProgram are presented below. Some programs hard-code part of the input, which is less flexible but more robust The amount of output present in the proof results is also different. Any variation of these algorithms can be implemented.

In a first variation, Alice wants to run AProgram(Input) and receive a proof of execution and therefore runs EProgram1 (Inputs) (431) where Inputs=((AProgram,Input,PC),Mode) (with 435: AProgram, 434: Input), with Mode 432 equal to "execution mode" and PC 433 a random string, and where EProgram1 is as defined below. PC is used by GetResponse(.) as a "pre-challenge" to compute the challenge for the random function, in order to generate the secret keys KE (in execution mode) or KA (in arbitration mode). Alice uses the technique of certified execution to execute EProgram1(Inputs) on Bob's security device using a CProgram 430 as described before. Alice checks the e-certificate to verify the authenticity of all the output that it gets back from the security device. The produced e-certificate is not only a certificate of the result 438 generated by Program(Input) but also of the generated e-proof 436.

```
EProgram1(Inputs):
begin program
var X,Mode,AProgram,Input,PC,Result,KE,KA,Checkbit,EMResult,EProof,
Results;
    (X,Mode)=Inputs;
    If Mode is execution mode:
    begin
        (AProgram,Input,PC)=X;
        Result=AProgram(Input);
        KE=GetResponse(PC);
        EMResult=E&M(Result,KE);
        EProof=(PC,EMResult);
        Results=(Result,EProof);
    end
    If Mode is arbitration mode:
    begin
        EProof=X;
        (PC,EMResult)=EProof;
        KA=GetResponse(PC);
        Result=D&M(EMResult,KA);
        CheckBit=(MAC of EMResult matches);
        Results=(Result,CheckBit);
    end
    Output(Results);
end program
```

In a second variation of the first embodiment, Alice hard-codes the random string PC into EProgram for increased robustness, and incorporates a hashed value of (part of) the application program AProgram and a hashed value of (part of) the application program input Input into Eproof, such that it can be verified later that exactly this program with this input has been used. In arbitration mode the EProof is only verified, covering AProgram, Input, and Result, but none of these are output to the third party user.

```
EProgram2(Inputs):
begin program
const PC=...;
var X,Mode,Program,Input,Result,KE,KA,Checkbit,EMResult,EProof,
Results;
    (X,Mode)=Inputs;
    If Mode is execution mode:
    begin
        (Program,Input)=X;
        Result=Program(Input);
        KE=GetResponse(PC);
        EMResult=E&M((Program,Input,Result),KE);
        EProof=(PC,EMResult);
        Results=(Result,EProof);
    End
    If Mode is arbitration mode:
    begin
        EProof=X;
        (PC,EMResult)=EProof;
        KA=GetResponse(PC);
        Result=D&M(EMResult,KA);
        CheckBit=(MAC of EMResult matches);
        Results=(CheckBit);
    end
    Output(Results);
end program
```

In a third variation of the first embodiment, the random string PC is omitted in the, thereby simplifying the computation. The key KE is computed in EProgram3 by KE=GetResponse( ) or even simpler a (new) primitive function KE=f(h(EProgram3)).

In a fourth variation of the first embodiment, PC and optionally other input parameters are, although not hard-coded (as in the second variation), still used as input to the random function in the primitive function. This is shown in EProgram3 where for example Program and Input are obtained as inputs to EProgram3 and used as input to GetResponse(.). Not all inputs need to be considered, as some inputs may not be of interest, should remain confidential between security device and user of the security device (and thus not be communicated to a third party), or should be allowed to be different between different program executions (the input which determines the operation mode should of course not be used).

```
EProgram3(Inputs):
begin program
const PC=...;
var X,Mode,Program,Input,Result,KE,KA,Checkbit,EMResult,EProof,
Results;
    (X,Mode)=Inputs;
    If Mode is execution mode:
    begin
        (Program,Input)=X;
        Result=Program(Input);
        KE=GetResponse((PC,Program,Input));
        EMResult=E&M((Program,Input,Result),KE);
        EProof=(PC,EMResult);
        Results=(Result,EProof);
    end
    If Mode is arbitration mode:
    begin
        EProof=X;
        (PC,EMResult)=EProof;
        KA=GetResponse((PC,Program,Input));
        Result=D&M(EMResult,KA);
        CheckBit=(MAC of EMResult matches);
        Results=(CheckBit);
    end
    Output(Results);
end program
```

In arbitration mode the arbiter executes the protocol with Bob's security device comprising three steps. In step 1 the arbiter receives from Alice or Bob a proof of execution EProof in step 450. He constructs Inputs=(EProof,Mode) (EProof: 444), where Mode 442 is equal to arbitration mode. The arbiter also obtains the same EProgram and CProgram (as presumably executed before; in this example communicated to the arbiter in step 451 and step 452), probably from Alice or Bob. Note that the arbiter doesn't need PC.

In step 2 the arbiter uses the technique of certified execution with CProgram 440 to execute EProgram(Inputs) (EProgram: 441) on Bob's security device. The arbiter checks the e-certificate 447 to verify the authenticity of Results that it gets back from the security device. If the e-certificate matches with Results then the arbiter knows that Bob's security device executed EProgram(Inputs) without anybodies interference and that nobody tampered with its inputs or outputs. In particular nobody modified the input EProof and nobody changed Mode. In other words, Bob's security device executed EProgram(Inputs) in arbitration mode using EProof. In arbitration mode, Result 445 can be supplied completely, partly, or not at all in the Output. It can also be replaced by information derived from the Result. This may depend on the application and on the arbiter. This decision is then implemented in the program. For example, for privacy reasons the EProgram could send only a summary of the results to the arbiter.

In step 3 the arbiter verifies whether CheckBit 446 is true, that is whether the MAC of EMResult matches. If so, the arbiter decides that AProgram(Input) on Bob's security device has computed EProof and Result in execution mode. If not, the arbiter decides Bob's security device has not computed EProof in execution mode. In arbitration mode EProgram either outputs that the MAC does not match (see the definition of D&M(.) and CheckBit), or outputs that the MAC does match together with a decrypted result To generate a fake e-proof FEProof=(FPC,FEMResult) for a (fake) result FResult is a so-called difficult problem.

In a second embodiment, proof results similar to an e-proof can be used to achieve secure memory control by specific programs on a specific security device with PUF, using insecure (possibly off-chip) physical memory or under difficult circumstances such as under interrupt handling, environments with software piracy, and in environments where unencrypted content is likely to be illegally distributed.

Figure 5:
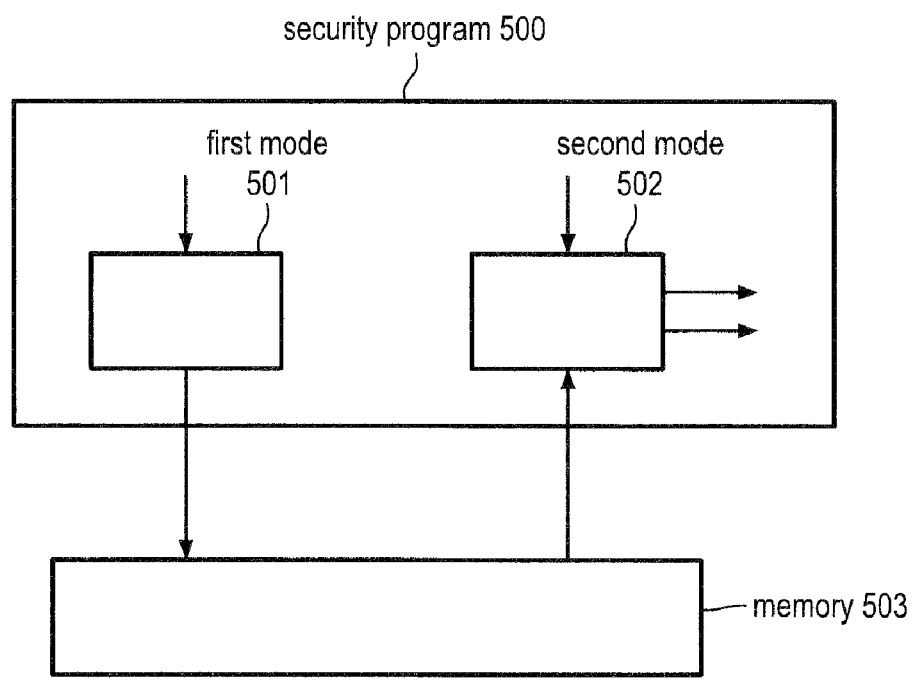
FIG. 5 illustrates secure memory implementation.

FIG. 5 illustrates secure memory implementation. In this embodiment, the first mode 501 or execution mode is used by the security program 500 to store the results in memory 503, and the second mode 502 or arbitration mode is used by the program to load the memory and to check its authenticity. It is assumed that the memory stores data Data at location Address. This can be a single address or a range of addresses. Data is stored in encrypted form as (PC,E&M(Data,K)), where K is equal to GetResponse(PC). The procedure, called Store, with input (Address,(PC,Data)) stores data, and corresponds to the execution mode in EProgram, where Result=Data, EMResult=EMData, and EProof=(PC,EMData). The procedure, called Load, with input Address loads data, and corresponds to the arbitration mode in EProgram, where Result=Data, EMResult=EMData, and EProof=(PC, EMData).

```
MProgram
begin program
    Store(Address,Data):
    begin procedure
    var PC, KE, EMData;
        KE=GetResponse(PC);
        EMData=E&M(Data,KE);
        Store (PC,EMData) at Address;
    end procedure
    Load(Address):
    begin procedure
    var PC,EMData,KA;
        Load (PC,EMData) from Address;
        KA=GetResponse(PC);
        Data=D&M(EMData,KA);
        CheckBit=(MAC of EMData matches);
        Output(Data,CheckBit);
    end procedure
end program
```

If a program MProgram(Input) with the procedures, Store (.) and Load(.) as part of its code, uses these procedures for memory access, then the program runs itself in both modes. Both GetResponse(.) in Store(.) and Load(.) depend on the hash of one and the same MProgram. If MProgram stores data, it operates in first mode: the data is written in encrypted e-proof format in memory. If it loads data, it operates in second mode: the outputted CheckBit is used to check the authenticity of the data in the sense that it originated from MProgram being executed on Bob's security device. In this sense MProgram is completely in control of the data it processes. It is up to MProgram whether to output unencrypted data to the public. This program is effectively the owner of the data.

Notice that an adversary may substitute the current memory by an older version and proceeds undetected. For checking the authenticity of memory being most up to date, the processor needs private memory to store a time counter. This time counter can be stored together with a MAC with a key derived from the PUF. Additionally, this idea can be improved using more sophisticated architectures securely utilizing off-chip resources memory authentication schemes as described in "Architectural Support for Copy and Tamper Resistant Software", David Lie and Chandramohan Thekkath and Mark Mitchell and Patrick Lincoln and Dan Boneh and John Mitchell and Mark Horowitz, Proceedings of the 9th International Conference on Architectural Support for Programming Languages and Operating Systems (ASPLOS-IX), November, 2000, p. 169-177, and "Caches and Merkle Trees for Efficient Memory Authentication", Blaise Gassend and G. Edward Suh and Dwaine Clarke and Marten van Dijk and Srinivas Devadas, Proceedings of the 9th International Symposium on High-Performance Computer Architecture, February, 2003.

Figure 6:
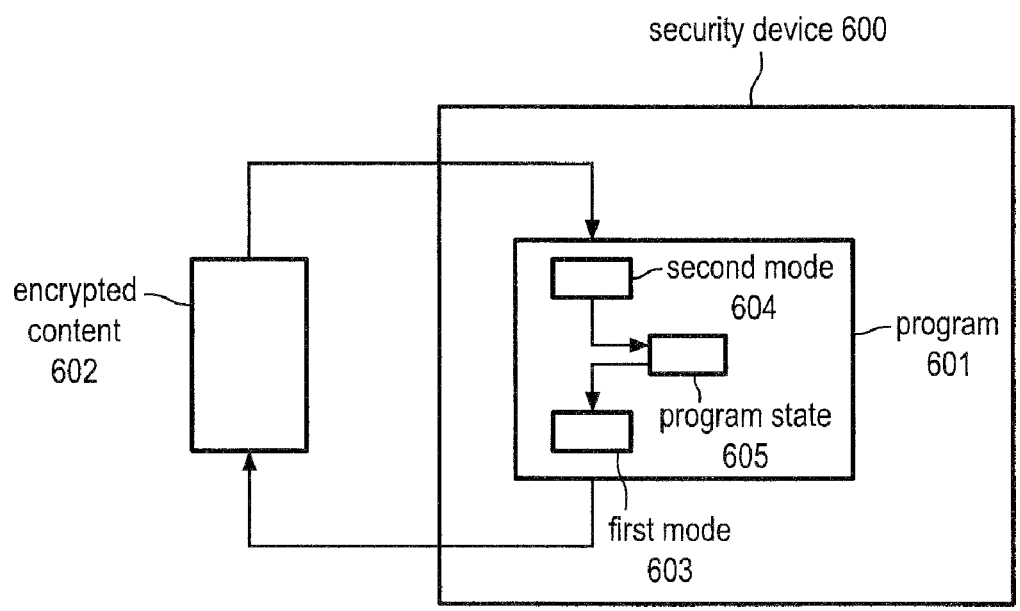
FIG. 6 illustrates interrupted processing.

FIG. 6 illustrates the architecture for both the third and forth embodiments of the invention.

In a third embodiment of this invention proof results are used to store program execution state 602, such that a program 601 running on the security device 600 is able to securely store its program state 605 in case of an interrupt. Upon interruption, the program state is encrypted (as in first mode, 603). The security device may continue its execution at a later moment without ever having revealed its state to the outside world. Upon continuation, the program state is verified and decrypted (as in second mode, 604) and restored. The program is therefore in full control. This allows secure execution robust against interruptions. Applications are secure interrupt handling, resistance against software piracy, and resistance against illegal distribution of unencrypted content.

In a fourth embodiment a program may store encrypted content 602 or encrypted software 602 for later use. The content only plays (or continues to play) or the software only runs (or continues to run) in the same state 605 on the same specific security device 600. This allows resistance against software piracy or illegal distribution of unencrypted content.

It is noted that the owner of the security device (Bob) and the user of the security device (Alice) may be one and the same identity. For example, Bob proves to others by means of his e-proof that he computed Result with Program(Input). Finally, it is an advantage of the invention that neither Alice or the Arbiter needs a PUF equipped security device.

The invention is generally applicable in the sense that it can be applied to all PUFs, digital as well as physical or optical. The details of the construction are given for physical PUFs but can be transferred to digital or optical PUFs.

Alternatives are possible. In the description above, "comprising" does not exclude other elements or steps, "a" or "an" does not exclude a plurality, and a single processor or other unit may also fulfill the functions of several means recited in the claims.

The invention claimed is:

1. Method to prove authenticity of execution of program instructions, comprising the steps of:
    (i) executing program instructions under control of a security program on a security device comprising a random function, the random function being accessible only from the security program through a controlled interface, the controlled interface comprising at least one primitive function accessing the random function that returns output that depends on at least part of a representation of at least those parts of the security program that call the primitive function, (ii) using the random function, computing proof results during execution of the security program operating in a first mode by accessing the random function through the controlled interface, and (iii) using the random function, verifying the proof results during execution of the same security program operating in a second mode by accessing the random function through the controlled interface, wherein the security program, if operating in the first mode, performs the steps of:

executing an application program with application program input generating application program output, using the random function through the controlled interface to obtain a result by encrypting, and generating a message authentication code for, at least one of at least part of the application program input, at least part of the application program output, and at least part of the application program, and generating proof results comprising the encrypted and message-authenticated result, and wherein the security program, if operating in the second mode, performs the steps of:

receiving proof results to be verified, and at least partially verifying the message authenticity of the encrypted and message-authenticated result in the proof results.

2. The method of claim 1, wherein a third party receives the proof results as verifiable proof of execution.

3. The method of claim 1, wherein the security program, if operating in the second mode, performs a further step of sending to the user of the security device at least part of the at least partially verified message authenticity of the encrypted and message-authenticated result in the string in the proof results.

4. The method of claim 1, wherein the proof results comprise storage data which are conceived for later use, the proof results enabling verification that the storage data originates from the security program being run on the security device.

5. The method of claim 4, wherein the storage data comprised in the proof results is encrypted with a key which is computed using a primitive function of which the output also depends on a representation of the security program.

6. The method of claim 1, wherein the proof results comprise status information which are conceived for later continuation of the security program.

7. The method of claim 6, wherein the status information comprised in the proof results is encrypted with a key which is computed using a primitive function of which the output also depends on a representation of the security program.

8. The method of claim 1, where the operation mode is selected by a user of the security device by supplying input to the security program.

9. The method of claim 1, wherein the security program is executed as part of a second security program, and the second security program providing certified execution which proves to the user of the security device that the security program is executed by the security device.

10. The method of claim 1, wherein the random function comprises a Physical Random Function (PUF).

11. The method of claim 1, wherein the random function is accessible via a primitive function $$\text{GetSecret(Challenge)}=h(h(\text{Program}),f(\text{Challenge})),$$

where $f(.)$ is the random function and $h(.)$ is substantially a publicly available random hash function.

12. The method of claim 1, further comprising:

generating a key for computing the proof results, and wherein the key generation depends on at least a part of the security program input used as input to the random function.

13. A non-transitory computer readable storage medium having computer executable instructions for causing a computer to implement the method according to claim 1.

14. System comprising a security device comprising a random function, processing device, comprising a processor and a memory, the security device having a security program, the random function being accessible only from the security program through a controlled interface, the controlled interface comprising at least one primitive function accessing the random function that returns output that depends on at least part of a representation of at least those parts of the security program that call the primitive function, the system being for executing computer-readable instructions, the instructions being arranged for causing the system to implement the steps of:

(i) executing program instructions under control of the security device;

(ii) using the random function, computing proof results during execution of the security program operating in a first mode by accessing the random function through the controlled interface, and (iii) using the random function, verifying the proof results during execution of the same security program operating in a second mode by accessing the random function through the controlled interface, wherein the security program of the security device, if operating in the first mode, performs the steps of:

executing an application program with application program input generating application program output, using the random function through the controlled interface to obtain a result by encrypting, and generating a message authentication code for, at least one of at least part of the application program input, at least part of the application program output, and at least part of the application program, and generating proof results comprising the encrypted and message-authenticated result, and wherein the security program of the security device, if operating in the second mode, performs the steps of:

receiving proof results to be verified, and at least partially verifying the message authenticity of the encrypted and message-authenticated result in the proof results.

\* \* \* \* \*